(12) United States Patent
Schog et al.

(10) Patent No.: US 7,431,132 B2
(45) Date of Patent: Oct. 7, 2008

(54) DISC BRAKE

(75) Inventors: Michael Schog, Mertloch (DE); Karl-Heinz Wollenweber, Ochtendung (DE); Christian Schroeter, Sinzig (DE); Dirk Hees, Mayen (DE); Guido Zenzen, Macken (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 11/230,093

(22) Filed: Sep. 19, 2005

(65) Prior Publication Data

US 2006/0060432 A1 Mar. 23, 2006

Related U.S. Application Data

(63) Continuation of application No. PCT/EP2004/002605, filed on Mar. 12, 2004.

(30) Foreign Application Priority Data

Mar. 20, 2003 (DE) .................. 103 12 479

(51) Int. Cl.
    *F16D 65/38* (2006.01)
(52) U.S. Cl. ................ 188/73.39; 188/73.45
(58) Field of Classification Search .......... 188/73.1, 188/73.32, 73.39, 73.45, 370
    See application file for complete search history.

(56) References Cited

U.S. PATENT DOCUMENTS

| | | | |
|---|---|---|---|
| 2,994,410 A * | 8/1961 | Burnett .............. | 188/72.3 |
| 3,119,468 A * | 1/1964 | Mossey .............. | 188/72.5 |
| 3,261,430 A * | 7/1966 | Wilson et al. ......... | 188/73.32 |
| 3,298,468 A | 1/1967 | Buyze | |
| 3,349,871 A * | 10/1967 | Walther et al. ........ | 188/73.39 |
| 3,915,263 A | 10/1975 | Courbot | |
| 4,093,043 A | 6/1978 | Smith | |
| 4,219,106 A | 8/1980 | Lüpertz et al. | |
| 4,460,071 A * | 7/1984 | Seki .............. | 188/73.39 |
| 5,238,090 A | 8/1993 | Weiler | |
| 5,860,496 A | 1/1999 | Kullman et al. | |
| 6,039,155 A | 3/2000 | Demoise, Jr. | |
| 6,062,349 A | 5/2000 | Boisseau et al. | |

FOREIGN PATENT DOCUMENTS

| | | |
|---|---|---|
| DE | 1 238 284 | 4/1967 |
| DE | 1 505 491 | 9/1969 |

(Continued)

OTHER PUBLICATIONS

Burckhardt, M., "Fahrwerktechnik: Bremsdynamik und Ptw-Bremsanlagen", pp. 196-201, 227.

*Primary Examiner*—Bradley King
(74) *Attorney, Agent, or Firm*—MacMillan, Sobanski & Todd, LLC

(57) ABSTRACT

A disc brake comprises a brake carrier, which is fastenable to the vehicle and is provided with bolts at the leading side and at the trailing side of the brake, which during braking take up the forces acting upon the brake linings. The relative dimensions and arrangements of the bolts and of the brake lining are such that, upon introduction of a brake force that is capable of decelerating the vehicle up to a maximum value in the region of 0.1 g, only tensile forces act upon the brake lining.

11 Claims, 9 Drawing Sheets

FOREIGN PATENT DOCUMENTS

| | | |
|---|---|---|
| DE | 1 575 920 | 1/1970 |
| DE | 2 211 013 | 9/1973 |
| DE | 28 45 404 | 5/1979 |
| DE | 28 04 808 | 8/1979 |
| DE | 29 31 216 | 3/1981 |
| DE | 39 10 969 | 10/1990 |
| DE | 39 33 395 | 4/1991 |
| DE | 41 15 064 | 12/1992 |
| DE | 43 24 988 | 2/1995 |
| DE | 44 16 815 | 11/1995 |
| DE | 196 52 936 | 6/1998 |
| DE | 197 19 640 | 11/1998 |
| DE | 100 06 393 | 8/2001 |
| EP | 0 218 033 | 4/1987 |

* cited by examiner

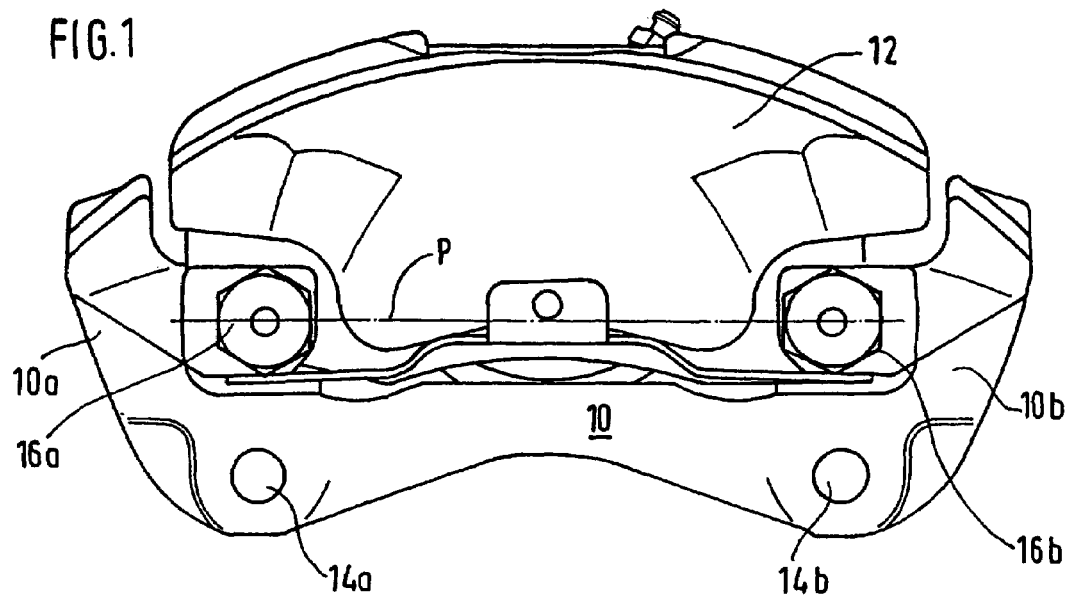
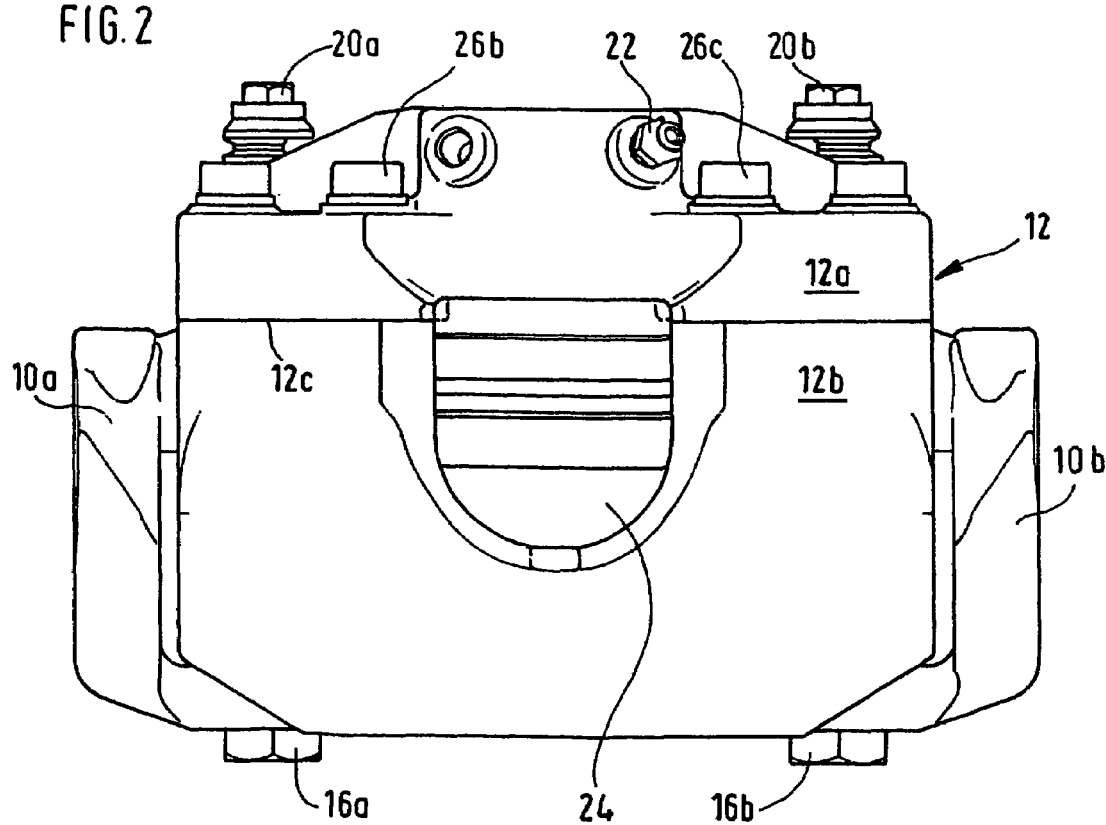

DISC BRAKE

CROSS-REFERENCE TO RELATED APPLICATIONS

This application is a continuation of International Application No. PCT/EP2004/002605 filed Mar. 12, 2004, the disclosures of which are incorporated herein by reference in entirety, and which claimed priority to German Patent Application No. 103 12 479.9 filed Mar. 20, 2003, the disclosures of which are incorporated herein by reference in entirety.

BACKGROUND OF THE INVENTION

The invention relates to a disc brake having a brake carrier, which is fastenable to the vehicle and which at the leading side and at the trailing side of the brake has bolts that take up tensile forces and/or compressive forces upon the brake linings during braking.

Brakes of this type are generally known. Usually the brake linings, comprising supporting plate and friction lining, are guided axially in relation to the brake disc by means of bolts fastened to the brake carrier. In disc brakes, "axially" generally means: in a direction parallel to the axis of rotation of the brake disc. "Radially" accordingly means in a direction at right angles to an axial direction in the aforesaid sense.

The background art of such disc brakes is represented e.g. by the following patent documents: DE 1 238 284, DE 1 505 491, and corresponding U.S. Pat. No. 3,298,468, both of which are incorporated by reference herein in entirety, DE 1 575 920, DE 196 52 936, DE 2 804 808, and corresponding U.S. Pat. No. 4,219,106, both of which are incorporated by reference herein in entirety, DE 39 33 395, and corresponding U.S. Pat. No. 5,238,090, both of which are incorporated by reference herein in entirety, DE 2 845 404, DE 41 15 064 and DE 4 416 815.

An ongoing technical problem in the design of disc brakes is the reduction of the manufacturing cost and the weight of the brake, simultaneously with high operational reliability and a low maintenance cost. The last two defined features in particular also include the avoidance of corrosion-related fault susceptibility of the brake. A particular problem with all brake designs is the prevention of squealing noises caused by vibrations.

It is to these technical features that the present invention is also devoted.

BRIEF SUMMARY OF THE INVENTION

The disc brake according to the invention is specified in claim 1. Preferred developments are described in the dependent claims.

The technical features discussed above are achieved according to the invention in that the central axes of the bolts define a plane that has a smaller radial spacing from the disc axis than the centre of area of the friction lining of the brake lining.

The brake lining according to the invention is provided for a disc brake that supports the brake lining on two bolts, wherein the brake lining has receivers for these bolts, on the inner surfaces of which tensile forces and/or compressive forces are exerted during braking. These receivers are so dimensioned that, upon introduction of a braking force capable of decelerating the vehicle up to a maximum value in the region of 0.1 g, only tensile forces act upon the brake lining. The receivers are provided in such a way that the central axes of the bolts define a plane that has a smaller radial spacing from the disc axis than the centre of area of the friction lining of the brake lining.

Preferred developments of the invention are described in the dependent claims. The invention also relates to a brake lining for use in a disc brake.

Further preferred developments of the invention are outlined in the dependent claims and in the following description of embodiments.

Other advantages of this invention will become apparent to those skilled in the art from the following detailed description of the preferred embodiments, when read in light of the accompanying drawings.0

BRIEF DESCRIPTION OF THE DRAWINGS

FIG. 1 a front view of a disc brake, i.e. viewed in the fitted state from the outside of the vehicle;

FIG. 2 the disc brake according to FIG. 1 in plan view, from above in the direction of the caliper;

DETAILED DESCRIPTION OF THE INVENTION

Figure 3:
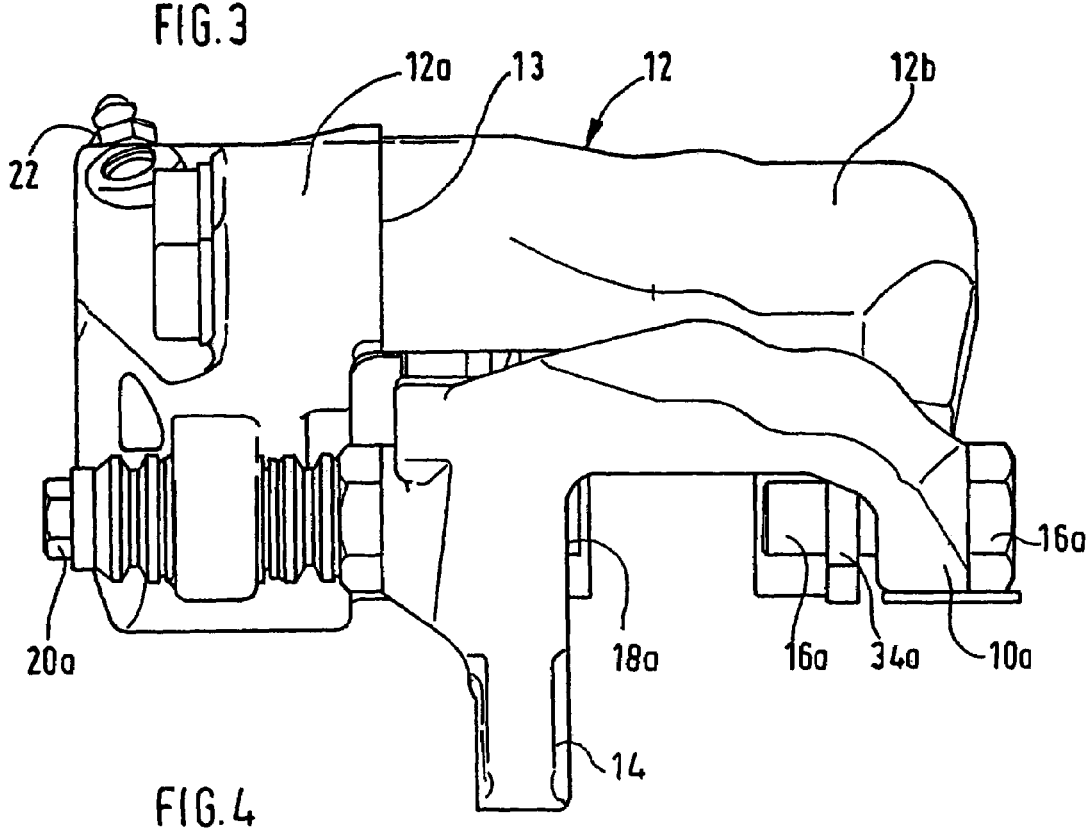
FIG. 3 the disc brake according to FIGS. 1 and 2 from the side, i.e. in the direction of the plane of the brake disc.

In the following drawings different embodiments are depicted, in which components having identical or similar functions to one another are characterized by the same reference characters.

As is illustrated in particular in FIGS. 1, 2, 5, 6, a brake carrier 10 has two arms 10a, 10b. Disposed above the brake carrier is a caliper 12, which in the illustrated embodiments is designed as a floating caliper of two-part construction. The caliper comprises, in relation to the vehicle, an inner portion 12a and an outer portion 12b. The portions 12a, 12b are firmly connected to one another by screws 26a, 26b, 26c, 26d (cf. FIGS. 2 and 7). The brake carrier 10 is fastened in a customary manner firmly to the vehicle, for which purpose holes 14a, 14b and screws (not shown) are used.

Figure 6:
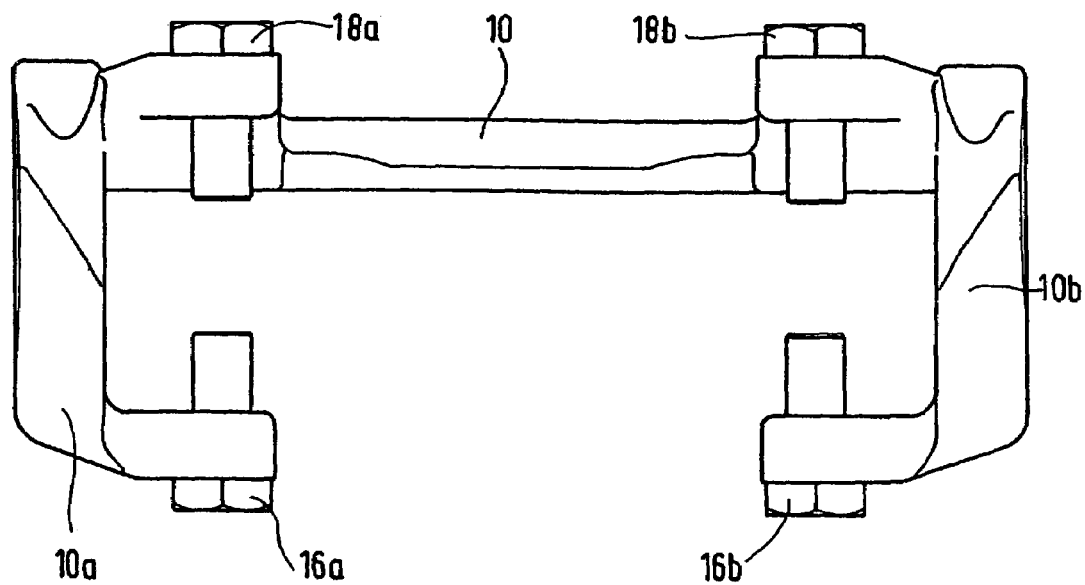
FIG. 6 a plan view of the brake carrier.

As in particular FIG. 6 (and FIGS. 1, 3, 4, 5) show, stud bolts 16a, 16b, 18a, 18b are firmly connected to the brake carrier 10. The said stud bolts are provided over part of their longitudinal extent with an external thread, which is screwed into a matching internal thread in the brake carrier 10. The portions of the stud bolts that are exposed in FIG. 6 (i.e. the portions that are not covered by the brake carrier in FIG. 6) are thread-free. These plain portions of the stud bolts 16a, 16b, 18a, 18b are used to support the brake linings in the manner described in detail further below. The bolts of the stud bolts, against which the brake linings are supported, are in the shape of a circular cylinder.

Figure 4:
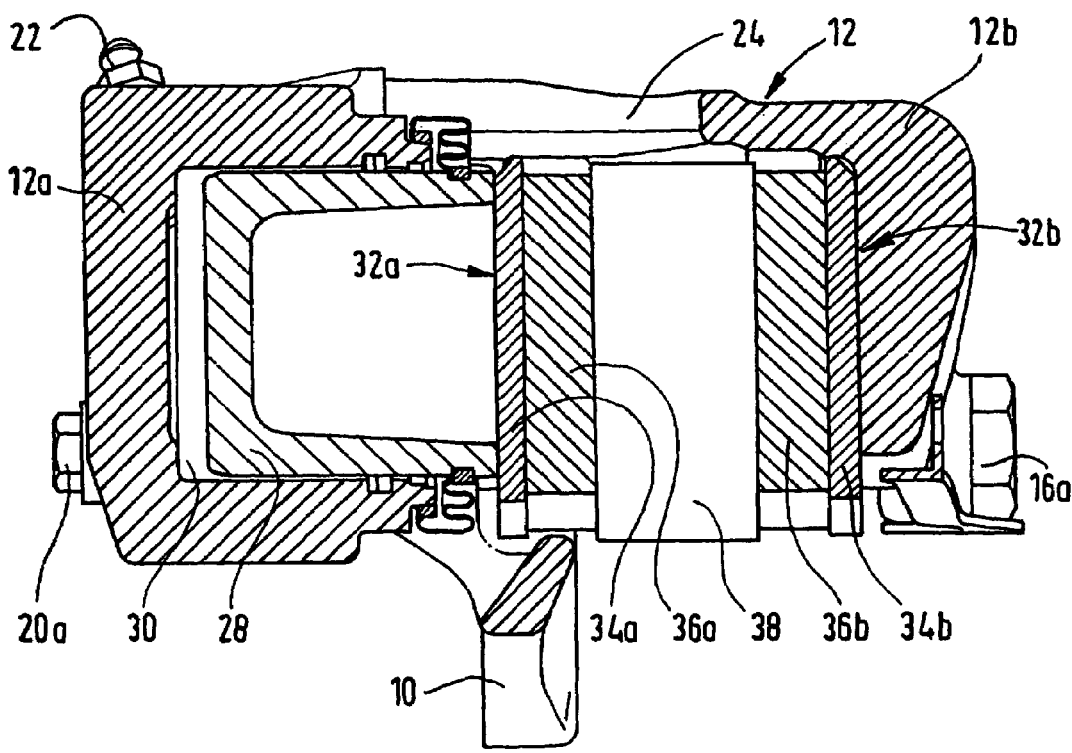
FIG. 4 the disc brake according to FIGS. 1 to 3 in section.
Figure 5:
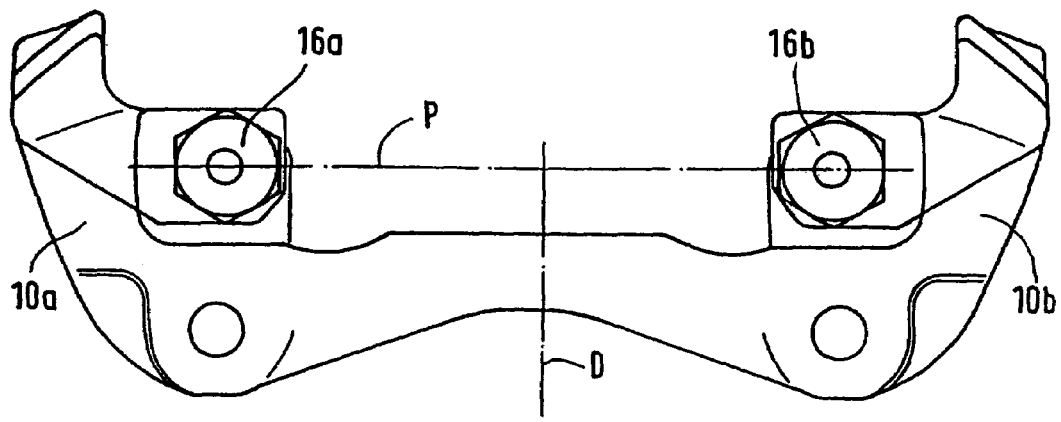
FIG. 5 a front view of the brake carrier.
Figure 7:
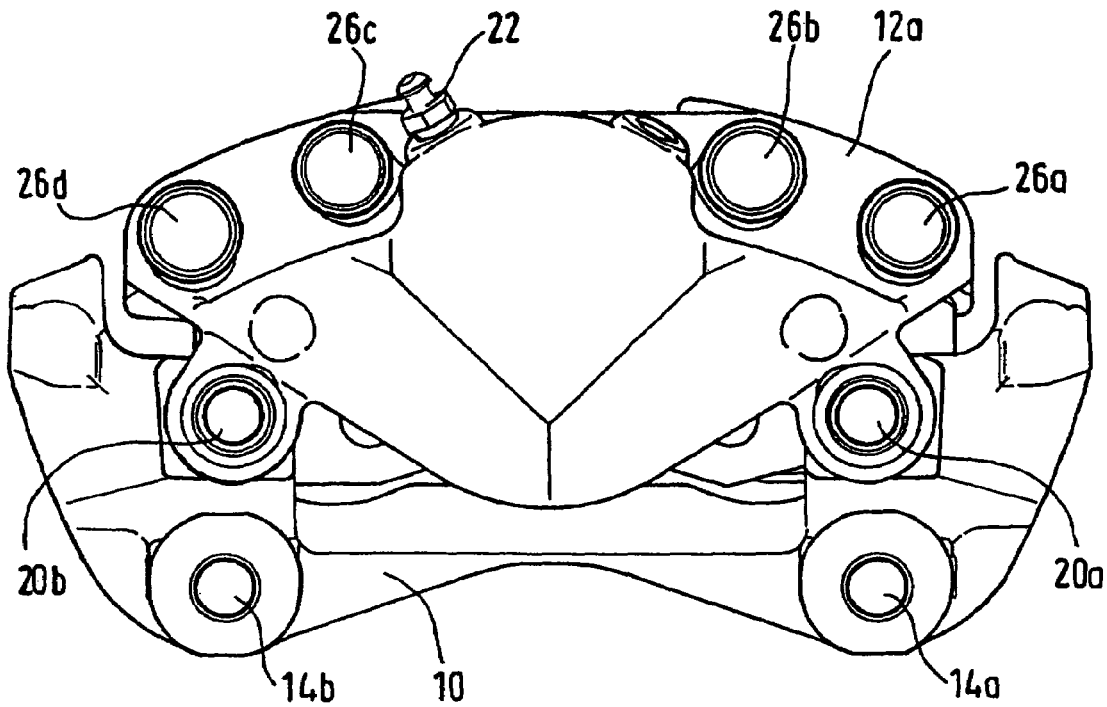
FIG. 7 the disc brake according to FIGS. 1 to 6 in a rear view, i.e. viewed in the fitted state from the interior of the vehicle.

As is evident in particular from FIGS. 3, 4, 7, the floating caliper 12 slides on stud bolts 20a, 20b. The stud bolts 20a, 20b are screwed into the stud bolts 18a, 18b situated at the inside of the vehicle, and namely coaxially, as is evident in particular from FIG. 3. For this purpose, the stud bolts 18a, 18b are each provided centrally with an internal thread, into which an external thread of the stud bolts 20a, 20b may be screwed. Thus, the stud bolts 20a and 18a as well as the stud bolts 20b, 18b are in each case coaxial with one another (cf. FIG. 3). The stud bolts 16a, 18a are likewise coaxial, as are the stud bolts 16b, 18b (FIG. 6).

According to FIGS. 2 and 7, the two caliper portions 12a, 12b are firmly connected to one another by means of screws 26a, 26b, 26c, 26d. The locating face of the two caliper portions 12a, 12b is denoted by 12c in FIG. 2.

In a conventional manner, brake fluid for moving the piston 28 is introduced through a fluid inlet 22 into a fluid chamber 30 (cf. FIG. 4). If, therefore, the fluid pressure is increased in the fluid chamber 30, the piston 28 moves in FIG. 4 to the right and the caliper 12 moves correspondingly to the left.

Figure 8:
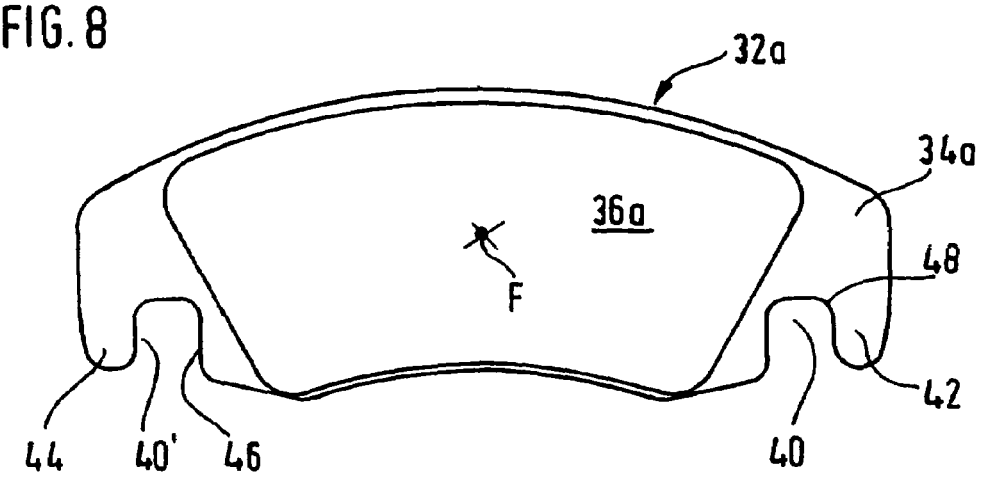
FIG. 8 a brake lining for use in a disc brake according to FIGS. 1 to 7.

FIG. 8 shows one (32a) of the two identically constructed brake linings 32a, 32b (cf. also FIG. 4). The brake lining 32a comprises a supporting plate 34a (made of metal) and a friction lining 36a. The friction lining 36a becomes worn by friction during braking. FIG. 8 also shows the centre of area F of the friction lining 32a. The brake lining has, at the leading side and at the trailing side of the brake, in each case a U-shaped recess 40, 40'. FIG. 8 also diagrammatically shows the axis of rotation A of the brake disc 38 (the latter not shown in FIG. 8, cf. FIG. 4).

The brake linings 32a, 32b are mounted by their U-shaped recesses 40, 40' from above onto the thread-free portions of the stud bolts 16a, 16b and 18a, 18b respectively. This leads to a line contact between a wall in the recesses 40, 40' and the surface of the respective stud bolt 16a, 16b, 18a, 18b.

The brake components, in particular the positions of the stud bolts 16a, 16b, 18a, 18b and the distances between the recesses 40, 40' in the brake linings 32a, 32b as well as the recesses 40, 40' themselves are so dimensioned that the longitudinal axes of the stud bolts 16a, 16b, 18a, 18b define a plane P that therefore passes through these axes, the distance D of which from the axis of rotation A of the brake disc (cf. FIGS. 5 and 8) is smaller than the distance of the centre of area F of the friction lining of the brake lining from this axis of rotation A.

According to a variant of the invention, the different dimensions are referenced not to the plane defined by the bolt axes, but to the bolt axes themselves. The bolt axes accordingly have a smaller radial spacing from the disc axis A than the centre of area F of the associated friction lining.

Furthermore, the said dimensions of the brake components are so selected that, upon introduction of a braking force capable of decelerating the vehicle up to approximately 0.1 g, only tensile forces act upon the brake linings. If in FIG. 8 the brake disc rotates in an anticlockwise direction about the axis A, then the leading side of the brake is on the right, i.e. corresponding to the recess 40, while the trailing side of the brake is on the left, corresponding to the recess 40'. With braking forces that, with good frictional engagement between tyres and road, do not exceed the said maximum vehicle deceleration of approximately 0.1 g, only tensile forces therefore arise at the brake lining 32a, i.e. at the leading side; FIG. 8, on the right the braking forces are taken up by the leading-side lobe 42 of the brake lining. The friction forces act in FIG. 8 in a leftward direction. It is only when a braking force above a deceleration of 0.1 g is introduced that the trailing face 46 of the brake lining strikes against the associated bolt in the recess 40' and the braking forces are absorbed by tensile forces at the lobe 42 and compressive forces at the face 46.

The dimensions of the brake may also be so selected that the brake linings 32a, 32b, upon transfer of a braking force that results from a hydraulic brake pressure of up to approximately 10 bar and corresponding to a vehicle deceleration of up to approximately 1 m/s2, always only the described tensile forces act on the brake lining, whereas given hydraulic brake pressures of more than 30 bar, corresponding to a vehicle deceleration of more than 3 m/s2, always both tensile forces and considerable compressive forces (as described above) act from the brake linings upon the bolts. In the transition range between 10 and 30 bar, a slowly increasing force distribution to both bolts occurs.

The previously described load transfers by tension and/or compression are preferably selected for the brake lining disposed at the outer side of the vehicle. For the brake linings disposed at the inner side of the vehicle, the dimensions are preferably so selected that these are predominantly in tension.

Figure 9:
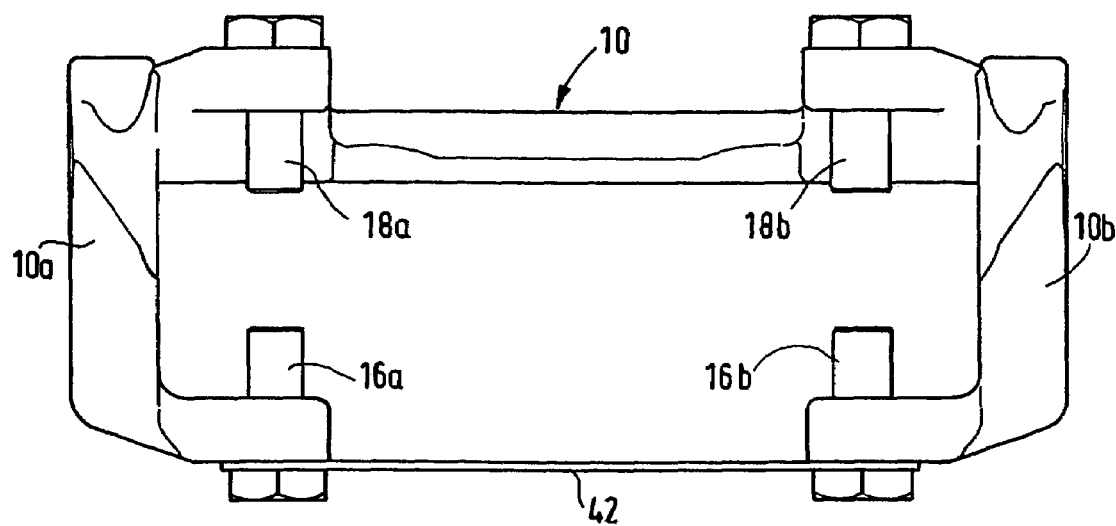
FIG. 9 a plan view of a development of the brake carrier.
Figure 10:
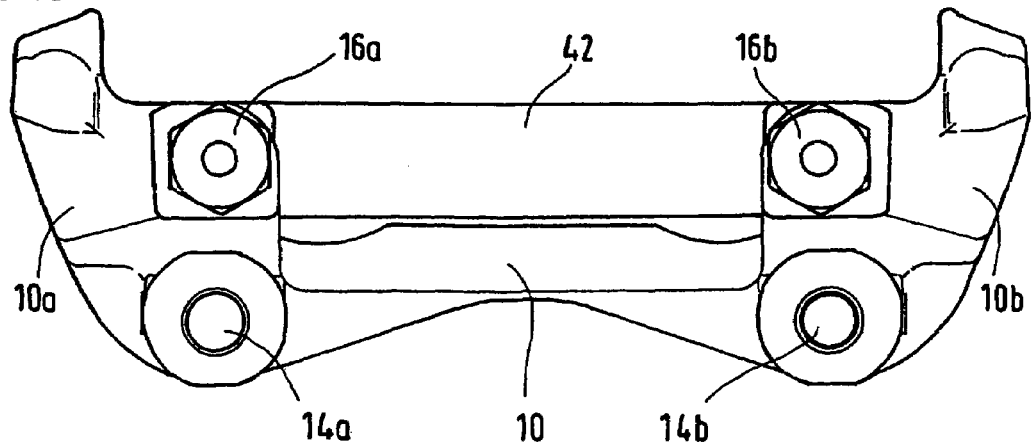
FIG. 10 a rear view of the brake carrier according to FIG. 9.

FIGS. 9 and 10 show a special development of the brake, in which the brake carrier 10 is provided at the outer side, in relation to the vehicle, with a bridge 42 that connects the free arms 10a, 10b of the brake carrier 10 to one another. The bridge 42 may be made e.g. of sheet metal and be screw-connected by means of the stud bolts 16a, 16b. The bridge 42 strengthens the brake carrier and may transfer loads. It may also be used, for example, to attach a designation or trademark.

The bridge 42 may also take the form of a multilayer metal sheet, in particular may be provided with damping material, preferably in a sandwich construction with the damping layer between metal layers. In said case, in a preferred manner no damping material is provided in the region of the screw-connection points (stud bolts 16a, 16b).

According to FIG. 8, the U-shaped recesses 40, 40' at their bases have rounded transitions between the side faces, wherein the transition radii (cf. reference character 48) are smaller than the radii of the supporting bolts 16a, 16b, 18a, 18b. It is thereby possible to define the lines of contact between the brake lining and the bolt more precisely.

The small, preferably linear, areas of contact of the bolts in the U-shaped recesses 40, 40' allow any products of corrosion to be removed on account of the high surface pressure. Vibrations are substantially avoided.

In the U-shaped recesses 40, 40', that is, between the bolt and the wall of the recess, there may be disposed e.g. a damping sheet that is adapted to the "U" in shape. The bolts 16a, 16b, 18a, 18b may also be provided with a sleeve, in particular a resilient (elastic) sleeve, which may likewise result in an increased damping of vibrations.

The previously described brake in particular has the added advantage of being particularly easy to manufacture and assemble. In the case of manufacture, the machining of the brake carrier entails only drilling, spot-facing and thread cutting.

Figure 11:
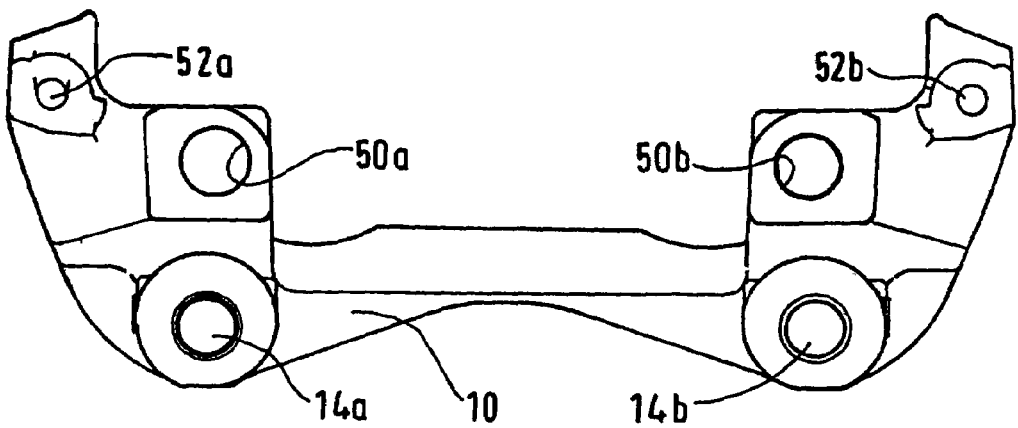
FIG. 11 a modified embodiment of a brake carrier.

FIG. 11 shows a brake carrier 10 that is modified compared to the embodiment according to FIG. 6. As in the embodiment according to FIG. 6, threaded bores 50a, 50b are also formed in the brake carrier 10 according to FIG. 11 for receiving the stud bolts 16a, 16b, 18a, 18b (not shown in FIG. 11). In a modification of the embodiment according to FIG. 6, however, in the embodiment of the brake carrier according to FIG. 11 the bolts for guiding the caliper are not screwed coaxially into the stud bolts that support a brake lining, rather separate threaded bores 52a, 52b are provided in the brake carrier 10 for receiving stud bolts (cf. FIG. 16, reference character 56a), on which the caliper may slide axially.

Figure 14:
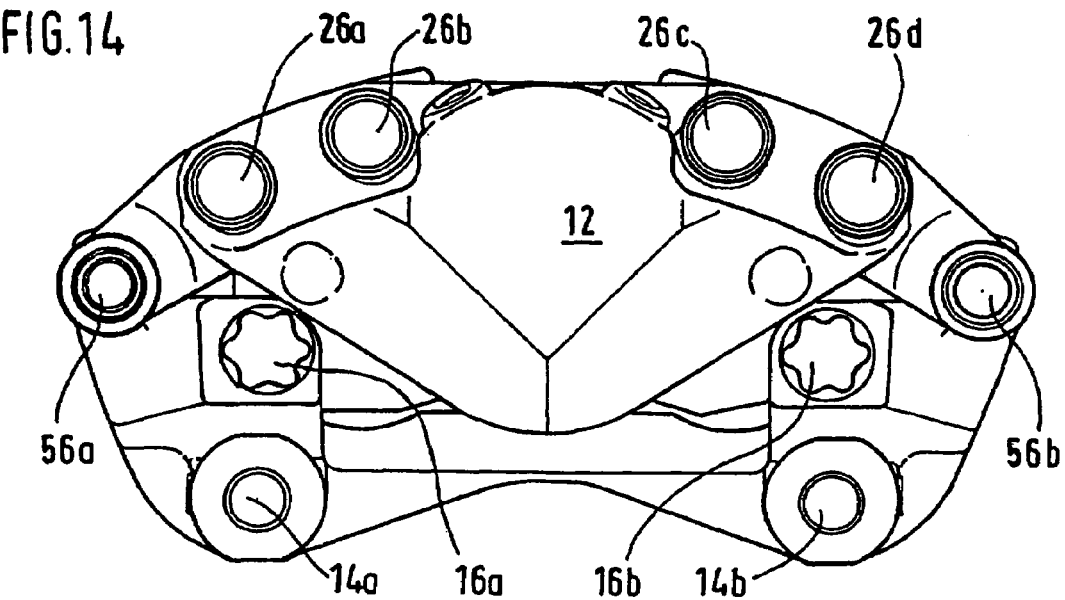
FIG. 14 the embodiment of a brake according to FIG. 11 with caliper in a rear view (i.e. viewed from the inside of the vehicle)
Figure 15:
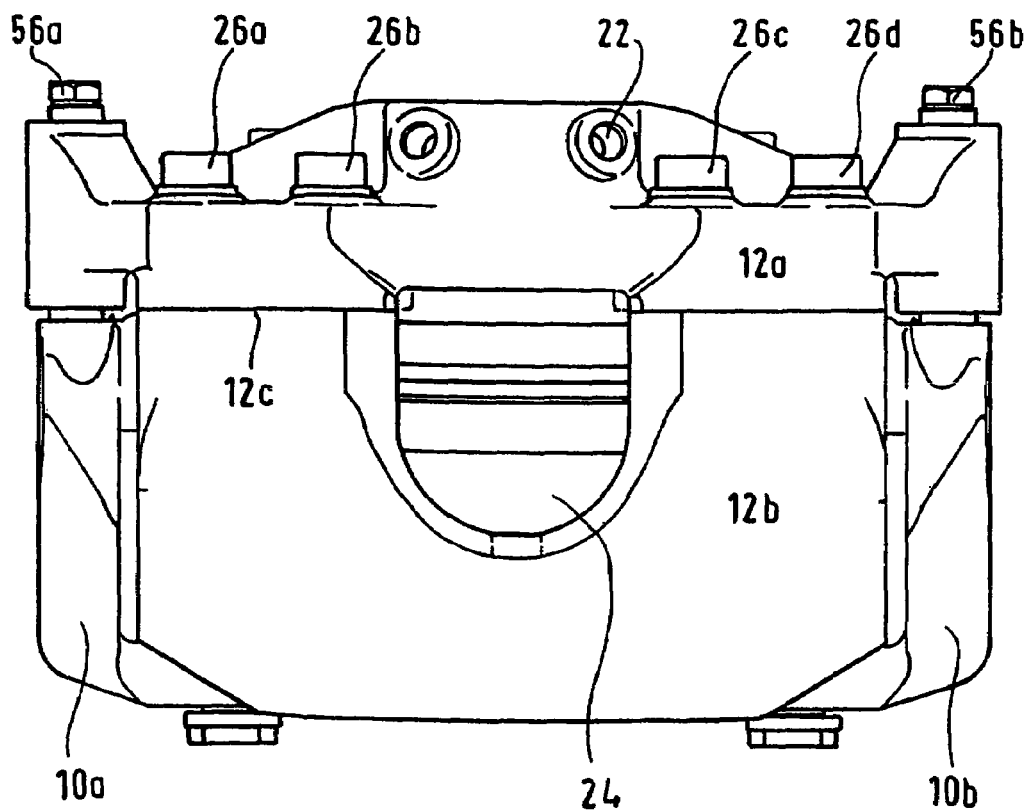
FIG. 15 a plan view of the embodiment of a brake according to FIGS. 11 and 14.
Figure 16:
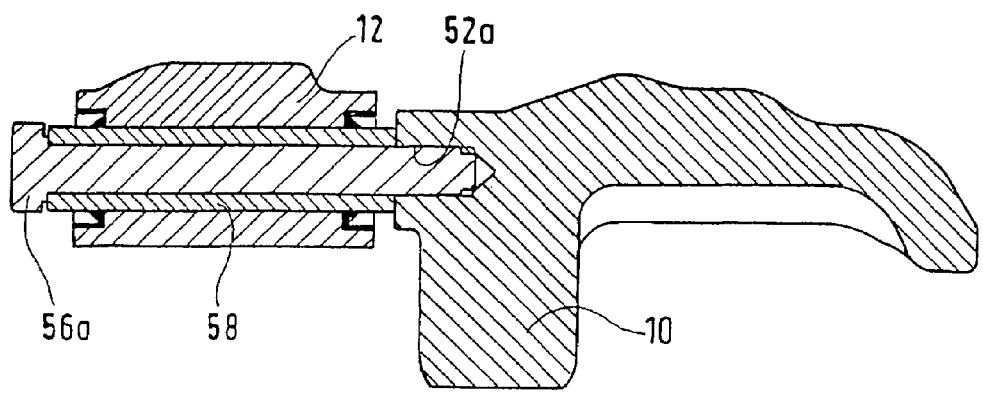
FIG. 16 the fastening of the floating caliper to the brake carrier in the embodiment of the brake according to FIGS. 11, 14, 15.

The brake having a brake carrier according to FIG. 11 otherwise, i.e. apart from the guidance of the caliper by means of the threaded bores 52a, 52b and corresponding stud bolts 56a (cf. FIG. 16), corresponds to the embodiment according to FIGS. 1 to 10. This is illustrated in FIGS. 14, 15 and 16, where the components and elements having an identical or at least similar function to corresponding components in the embodiment according to FIGS. 1 to 10 bear the same reference characters as in FIGS. 1 to 10. In a modification of the previously described embodiment, the floating caliper 12 therefore slides on stud bolts 56a, 56b, which are screwed into the threaded bores 52a, 52b (FIG. 11).

Figure 12:
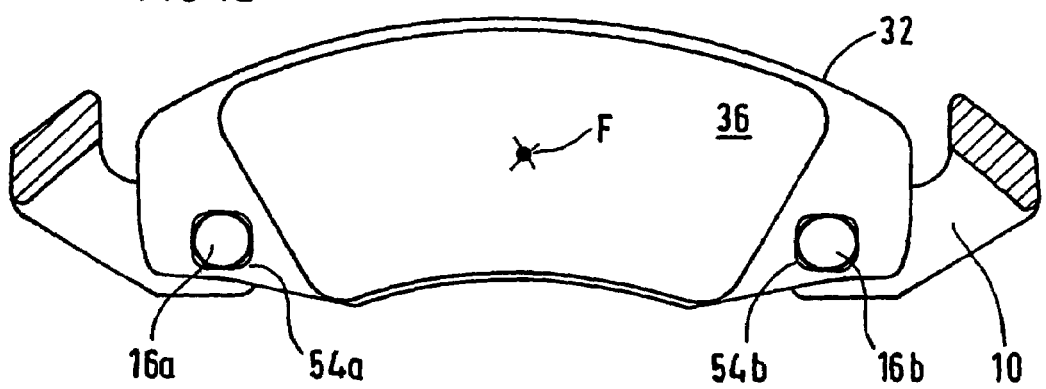
FIG. 12 a modified embodiment of a brake lining with the brake carrier partially in section.

FIG. 12 shows a brake lining 32, which is modified compared to the embodiment according to FIG. 8, with a friction lining 36. This brake lining 32 is shown to a slightly enlarged scale in FIG. 13 without the brake carrier 10.

In the embodiments according to FIGS. 1 to 17 the stud bolts 16a, 16b, 18a, 18b, on which the brake linings are supported, are each cylindrical in the supporting region.

FIG. 16 shows the detail, already mentioned above, of the supporting of the floating caliper 12 on the brake carrier 10 by means of a stud bolt 56a (the other side of the brake is of a corresponding design with a stud bolt 56b, cf. FIG. 14), which is screwed into a threaded bore 52a in the brake carrier 10. A sleeve 58, known as such, lies between the stud bolt 56a and the caliper 12. The sliding guide is sealed in a conventional manner.

Figure 17:
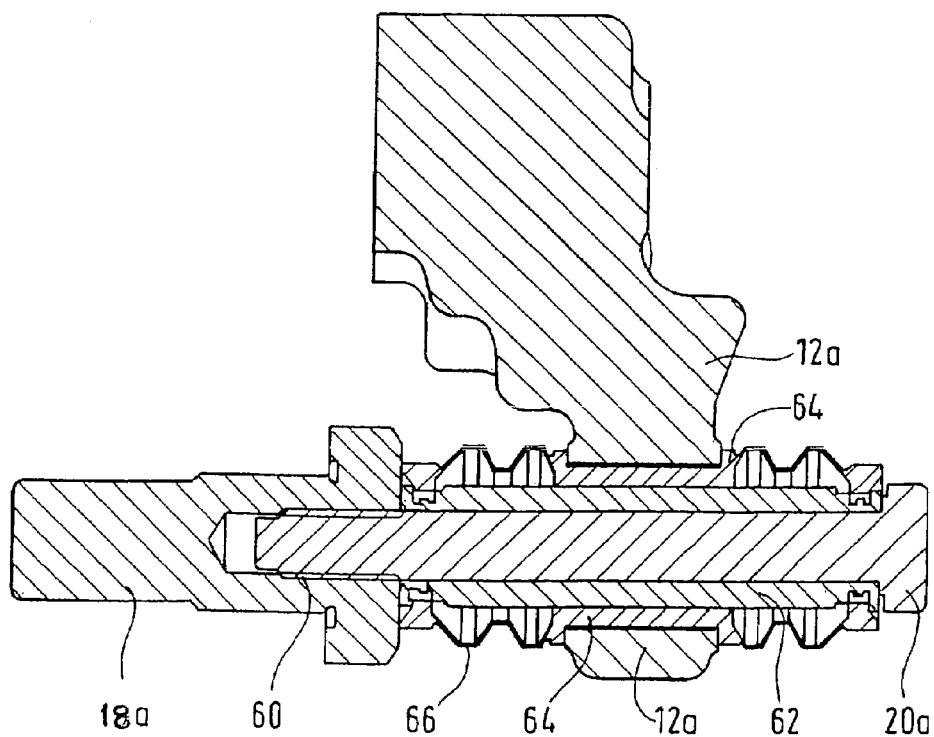
FIG. 17 the bolt guide of the floating caliper in a brake according to the embodiment according to FIGS. 1 to 10.

FIG. 17 shows a detail of the brake according to FIGS. 1 to 10, namely the coaxial arrangement of the stud bolt 20a, on which the floating caliper 12 slides, and the stud bolt 18a, which supports the brake lining. As already explained above, there is formed centrally in the stud bolt 18a an internal thread 60, into which the stud screw 20a is screwed by a matching external thread. A sleeve 62 surrounds the stud bolt 20a. Sliding on the sleeve 62 is a further sleeve 64, which is firmly connected to the caliper 12. The sliding surface at the outer side of the sleeve 62 is sealed by means of a seal 66.

Figure 13:
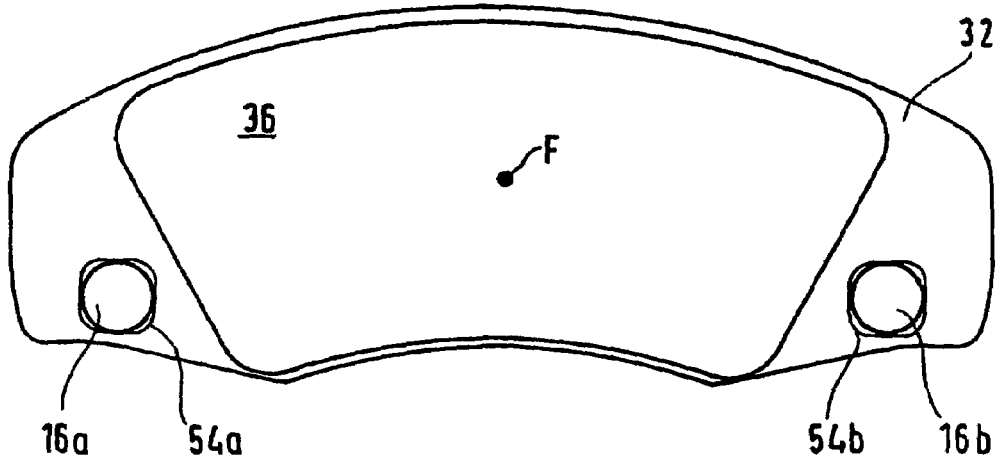
FIG. 13 an enlarged view of the brake lining according to FIG. 12.
Figure 18:
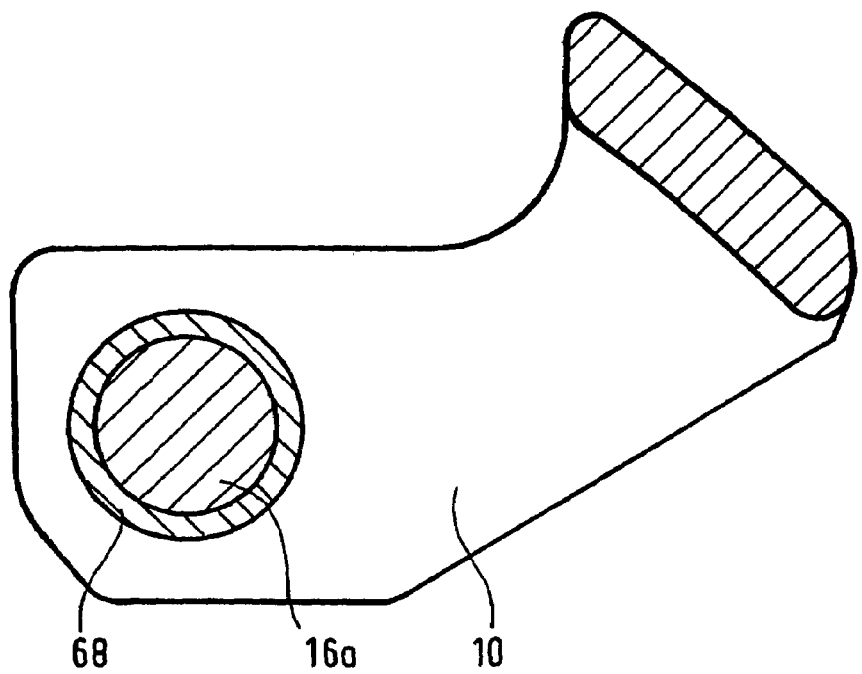
FIG. 18 part of the brake carrier with bolt and a resilient sleeve.

FIG. 18 shows a detail of a preferred development of a brake carrier 10 having a bolt 16a, which here is provided with a sleeve 68, on which the brake lining is supported, either by means of the U-shaped recesses according to FIG. 8 or by a hole 54a and/or 54b according to FIGS. 12, 13. The sleeve 68 may possess corrosion-inhibiting properties and/or damping properties between the brake lining and the bolt.

Figure 19:
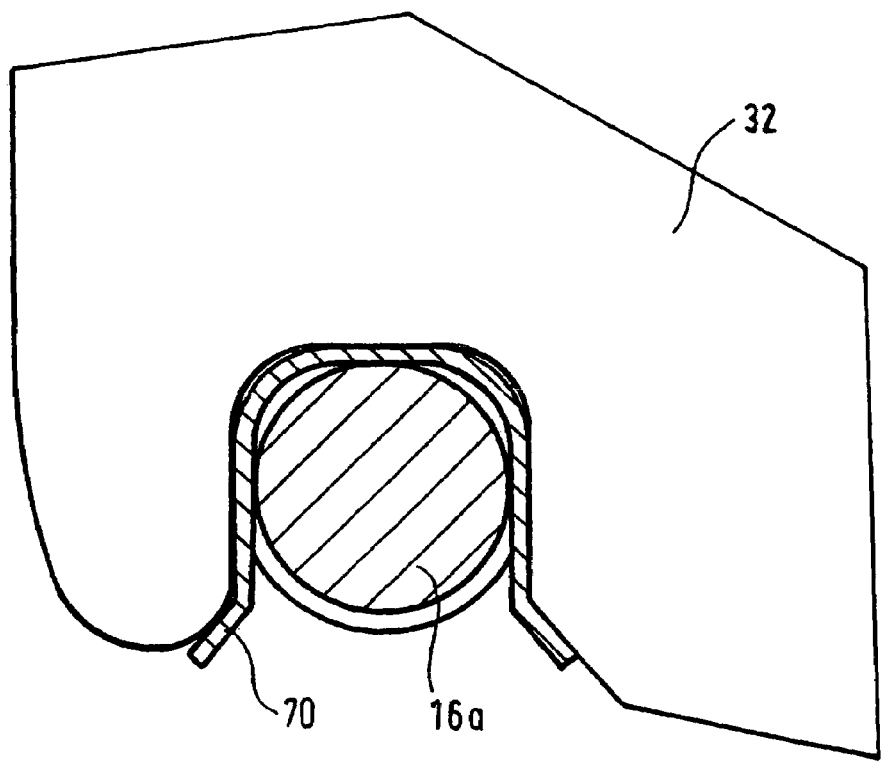
FIG. 19 part of a brake lining and a lining-retaining bolt with a damping sheet.

FIG. 19 shows a detail of a preferred development having a brake lining 32, which is to be e.g. one of the brake linings 32a, 32b according to the above embodiments, and having a bolt 16a, the arrangement might be constructed correspondingly with the bolt 16b, wherein a spring steel sheet 70 is disposed for damping purposes between the bolt and the brake lining.

In a modification of the floating caliper brakes described as embodiments above, the invention may be realized also with a fixed caliper brake. To that extent, the brake carrier and the bolts as well as the associated features of the brake linings correspond to those of the floating caliper brake. With the fixed caliper, there is merely a different introduction of force into the brake linings. In the fixed caliper brake, the recesses corresponding to the reference characters 40, 40' in FIG. 8 may preferably take the form of oblong holes. A particular advantage of these embodiments of the invention is that, because of the tensioned brake linings, in a four-piston brake all of the piston diameters may be of equal size. It is not necessary to provide larger piston diameters at the trailing side.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Disc brake having a brake carrier, which is fastenable to the vehicle and has bolts at the leading side and at the trailing side of the brake, which during braking exert tensile forces and compressive forces upon at least one brake lining, wherein the brake lining has receivers for the bolts, so that the tensile forces and compressive forces are exerted at inner surfaces of the receivers, and wherein the relative dimensions and arrangements of the bolts and of the brake lining are such that, upon introduction of a first braking force only tensile forces act upon the brake lining, and upon introduction of a second braking force both tensile forces and considerable compressive forces act upon the brake lining, wherein centrelines of the bolts define a plane that has a smaller radial spacing from a disc axis than a centre of area of a friction lining of the brake lining, wherein the receivers are U-shaped recesses into which the bolts engage, and wherein the brake lining is configured to be mounted radially from above onto the bolts.

2. Disc brake according to claim 1, wherein the plane defined by the centrelines of the bolts has an at least 5% smaller radial spacing from the disc axis than the centre of area of the friction lining of the brake lining.

3. Disc brake according to claim 1, wherein the brake lining is an outer brake lining.

4. Disc brake according to claim 1, wherein the brake lining in the U-shaped recesses has line contact with the respectively associated bolt.

5. Disc brake according to claim 1, wherein the bolts are made of a different material to the brake carrier.

6. Disc brake according to claim 1, wherein the disc brake is a floating caliper brake, a floating frame brake or a fixed caliper brake.

7. Disc brake according to claim 1, wherein the plane defined by the centrelines of the bolts has an at least 10% smaller radial spacing from the disc axis than the centre of area of the friction lining of the brake lining.

8. Disc brake according to claim 1, wherein the plane defined by the centrelines of the bolts has an at least 15% smaller radial spacing from the disc axis than the centre of area of the friction lining of the brake lining.

9. Disc brake according to claim 5, wherein the bolts are made of a corrosion-resistant steel.

10. Disc brake according to claim 5, wherein the bolts are provided with a coating of non-corroding material.

11. Disc brake according to claim 5, wherein the bolts are protected against corrosion by nitration.

* * * * *